(12) United States Patent
Miftakhov et al.

(10) Patent No.: US 11,508,979 B2
(45) Date of Patent: Nov. 22, 2022

(54) AIRCRAFT FUEL CELL SYSTEM WITHOUT THE USE OF A BUFFER BATTERY

(71) Applicant: ZeroAvia, Inc., Hollister, CA (US)

(72) Inventors: Valery Miftakhov, San Carlos, CA (US); Vadim Belogorodsky, Huntingdon Valley, PA (US); Ilya Henry Grishashvili, San Jose, CA (US)

(73) Assignee: ZeroAvia, Inc., Hollister, CA (US)

( * ) Notice: Subject to any disclaimer, the term of this patent is extended or adjusted under 35 U.S.C. 154(b) by 170 days.

(21) Appl. No.: 16/798,296

(22) Filed: Feb. 21, 2020

(65) Prior Publication Data

US 2020/0358117 A1 Nov. 12, 2020

Related U.S. Application Data

(60) Provisional application No. 62/808,569, filed on Feb. 21, 2019.

(51) Int. Cl.
*H01M 8/04858* (2016.01)
*H01M 8/04111* (2016.01)
*H01M 8/04746* (2016.01)
*B64D 41/00* (2006.01)

(52) U.S. Cl.
CPC ........ *H01M 8/04932* (2013.01); *B64D 41/00* (2013.01); *H01M 8/04111* (2013.01); *H01M 8/04753* (2013.01); *B64D 2041/005* (2013.01); *H01M 2250/20* (2013.01)

(58) Field of Classification Search
CPC ......... H01M 8/04832; H01M 8/04111; H01M 8/04753; H01M 8/04952; H01M 8/04089; H01M 8/04104; H01M 8/0441; H01M 8/04395; H01M 8/04455; H01M 8/0447; H01M 8/04783; H01M 8/04835; H01M 8/04843; H01M 2250/20; H01M 16/006; H01M 8/04932; B64D 41/00; B64D 2041/005

See application file for complete search history.

(56) References Cited

U.S. PATENT DOCUMENTS

2014/0120444 A1* 5/2014 Zhang ............... H01M 8/04395
429/444
2017/0170494 A1* 6/2017 Lents ..................... B64D 37/32

* cited by examiner

*Primary Examiner* — Ula C Ruddock
*Assistant Examiner* — Matthew W Van Oudenaren

(57) ABSTRACT

In one or more embodiments of the novel aircraft fuel cell system without the use of a buffer battery, the fuel cell and compressor would be sized sufficiently larger for the intended application, allowing the compressor to change speeds much faster. This in turn would allow power outputs to change much quicker. If power outputs can change as quickly as the application dictates, then a buffer battery is not necessary. In one or more embodiments, because the system is mostly electronically controlled, software can be written to protect the fuel cell from instantaneous power spikes. If a large power output is suddenly requested of the fuel cell, the software can smooth out the demand curve to provide an easier load profile to follow.

6 Claims, 3 Drawing Sheets

AIRCRAFT FUEL CELL SYSTEM WITHOUT THE USE OF A BUFFER BATTERY

CROSS-REFERENCE TO RELATED PATENT APPLICATION

This regular U.S. patent application relies upon and claims the benefit of priority from U.S. provisional patent application No. 62/808,569, entitled "AIRCRAFT FUEL CELL SYSTEM WITHOUT THE USE OF A BUFFER BATTERY," filed on Feb. 21, 2019, which is incorporated by reference herein in its entirety.

BACKGROUND OF THE INVENTION

Field of the Invention

The disclosed embodiments relate in general to clean energy-based air transportation systems technology, and, more specifically, to an aircraft fuel cell system without the use of a buffer battery.

Description of the Related Art

Conventional hydrogen fuel cell technology mixes pure hydrogen gas and oxygen found in the atmosphere to create an electrical charge across a catalytic membrane, commonly referred to as a cell. By combining multiple cells in series, a fuel cell stack is created, and thus the output voltage of the system can be increased. Secondly, the current that can be extracted from the fuel cell stack is dependent on the rate of the chemical reaction between the hydrogen and oxygen. Increasing the amounts of these reactants yields an increasing amount of current within operational limits. Since the volume of a fuel cell is fixed by its physical dimensions, the two reactants must be pressurized to increase their masses per given volume.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
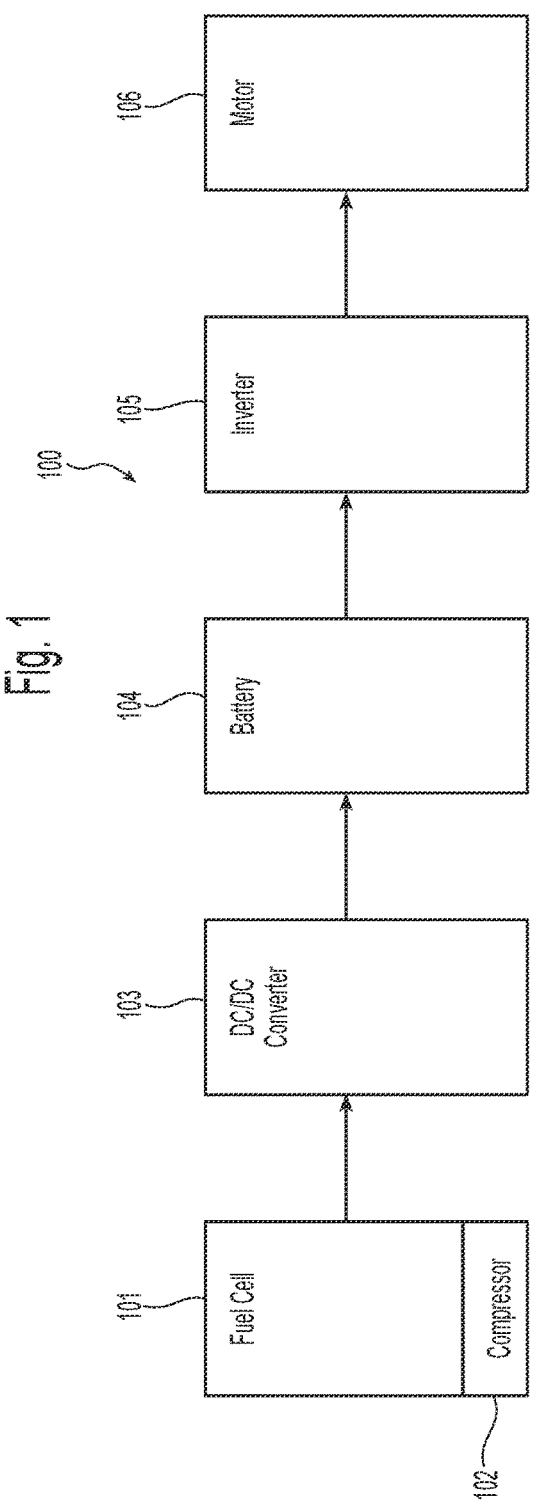
FIG. 1 illustrates a traditional aircraft fuel cell system architecture.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

The pure hydrogen gas supply is commonly pumped into and stored in high pressure tanks at roughly 350 bar to 700 bar. The oxygen is sourced from the surrounding ambient air, containing roughly 21% oxygen, and thus must be pressurized by a device before entering the fuel cell stack to achieve high volumetric flow rates and high overall levels of power density for the fuel cell system. The device responsible for pressurizing and creating the necessary air flow is usually an air compressor. These air compressors come in two main varieties: mechanical compressors coupled to a shaft, or electronically controlled compressors.

Since the hydrogen supply is already in pressurized form, it is traditional to throttle the power output of the fuel cell by modifying the amount of air being fed into the fuel cell. This is done by speeding up or slowing down the air compressor as required by the application. Because the air compressor is a physical object, there are limits to how quickly it can be sped up or slowed down, thus affecting the response time of the fuel cell's power delivery. Generally, the oxygen supply (provided by compressed air) is the limiting factor of fuel cell power output.

Secondly, as ambient air contains mostly nitrogen (78%), there are other chemical reactions and processes that take place within the fuel cell. These other processes lead to inefficiencies in the system, and thus do not allow the fuel cell to operate in a linear power output, nor without a minimum power requirement.

The minimum operating power requirement for a fuel cell stack is centered around the humidity level within the fuel cell stack. Since water vapor is a product of the chemical reaction between hydrogen and oxygen, controlling the fuel cell is as much about getting the water out, as it is getting the reactant gases in. The management of this water vapor is extremely important, as too much water vapor on each cell will reduce surface area available for future chemical reactions to occur, and thus lowering the power output of the stack; and too little water vapor on each cell will increase the available surface area for the reaction, increasing the reaction rate, and potentially causing the fuel cell to heat up and oxidize the membrane on which the reactions occur. This oxidation is irreversible, and will permanently damage the fuel cell's ability to produce its rated power output.

This minimum power requirement is a challenge for aviation use cases, as an aircraft's load profile is dramatically different from common fuel cell applications. Primarily, as the passengers board, the system is started up, and the plane taxis to the runway in preparation for take-off, the plane uses very little power, most likely below the manufacturer's minimum power requirement for safe operation.

Currently, the most common implementation of a fuel cell system 100 requires a buffer battery 104 to physically drive the load/application, leaving the fuel cell system 100 to only charge the battery 104 as needed (See FIG. 1). More particularly, the system 100 includes a fuel cell 101 operably coupled to a compressor 102 to feed the air to the fuel cell 101, a DC/DC converter 103, a buffer battery 104, and inverter 105 all operably connected to ultimately run a motor 106.

Figure 2:
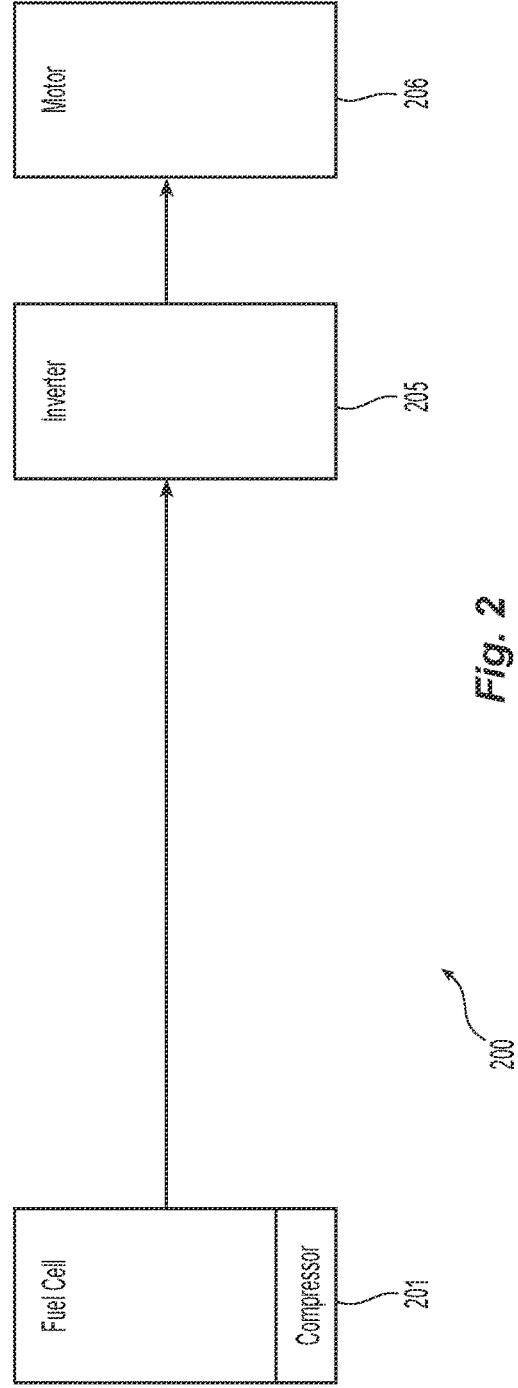
FIG. 2 illustrates a traditional aircraft fuel cell system architecture without the use of a buffer battery.

If power required by the application is below the manufacturer's minimum power requirements, the vehicle uses the buffer battery 104 to propel itself. Once the system 100 deems the battery 104 must be charged, the fuel cell 101 kicks on and charges the battery 104. This creates a smooth and known power requirement for the fuel cell 101 above its minimum operating power threshold, while the battery 104 tailors to the dynamic nature of the loadIn the proposed systems, there are quite a few inventive techniques that allow the successful operation and deployment of fuel cell technology without the use of a buffer battery (See FIG. 2), with no detrimental effects to performance and the application.

1. Actively Managing Fuel Cell Load Demand—Below Minimum Power

The fuel cell system 100 is designed to operate in a very narrow temperature range. At power levels above the manufacturer's minimum power output, the fuel cell will continue to heat itself in the process of generating power output and regulate its own temperature. In the case when the power generation is below the manufacturer's minimum power and the fuel cell cannot raise its own temperature to the specified range, the present disclosure envisions adding a sizeable load to the system 100 via a resistive heater circuit(s) in the fuel cell's coolant circuit(s) (not shown).

This heater circuit(s) will be combined in parallel with the load and fuel cell output.

This strategy will accomplish two things: simultaneously raise the load power drawn from the fuel cell, and heat up the coolant circuit(s) to the correct operating temperatures.

While a traditional system 100 may use a battery to operate below minimum power requirement levels, it is envisioned to utilize the above method of increasing the load power.

2. Actively Managing Fuel Cell Load Demand—Above Maximum Power (Not shown)

The power output of a fuel cell 101 is limited by the reaction rate, and as such, the oxygen supply is usually the limiting factor of traditional systems. If oxygen supply is taken care of (see below for various methods to accomplish this purpose), then the next limiting factor for fuel cell 101 power output is thermal management and keeping the fuel cell stack within the correct operating temperature range. It is contemplated that using an active cooling system (not shown), controlled and monitored by the fuel cell system 100 to actively cool the fuel cell 101 stack to allow operation past the designed maximum power level will accomplish this purpose.

This can be done with traditional cooling circuits (not shown) consisting of coolant pumps, temperature sensors, heat exchangers, and valves to direct and confirm the direction of flow throughout the system 100.

While a traditional system may use a battery 104 to operate short intervals above the fuel cell's 101 maximum output levels, the above method will allow the safe operation of the fuel cell 101 without the use of a buffer battery 104.

3. Lowering the Stack Temperature to facilitate a Lower Minimum Operating Power (Not shown)

The fuel cell 101 stack is an actively-cooled component, with specifically targeted operating temperatures. These temperatures promote ideal reaction rates at each cell membrane, thus promoting peak power outputs. While the manufacturer of the fuel cell 101 designs the fuel cell 101 for a specific maximum power output, the idea is to operate the fuel cell 101 at a lower core temperature when the power required by the application is below the minimum power threshold of the fuel cell 101 stack. This provides the following benefits:

Lower fuel cell 101 stack core temperature creates a higher temperature delta as the fuel cell 101 operates between cell membrane temperature and reaction temperature.

This higher temperature delta facilitates the formation of more condensation on the cell membranes.

More condensation on each fuel cell 101 cools the membrane and prevents the damaging oxidation from occurring.

Lack of oxidation on the fuel cells 101 promotes low power applications, thus not requiring the buffer battery 104.

Figure 3:
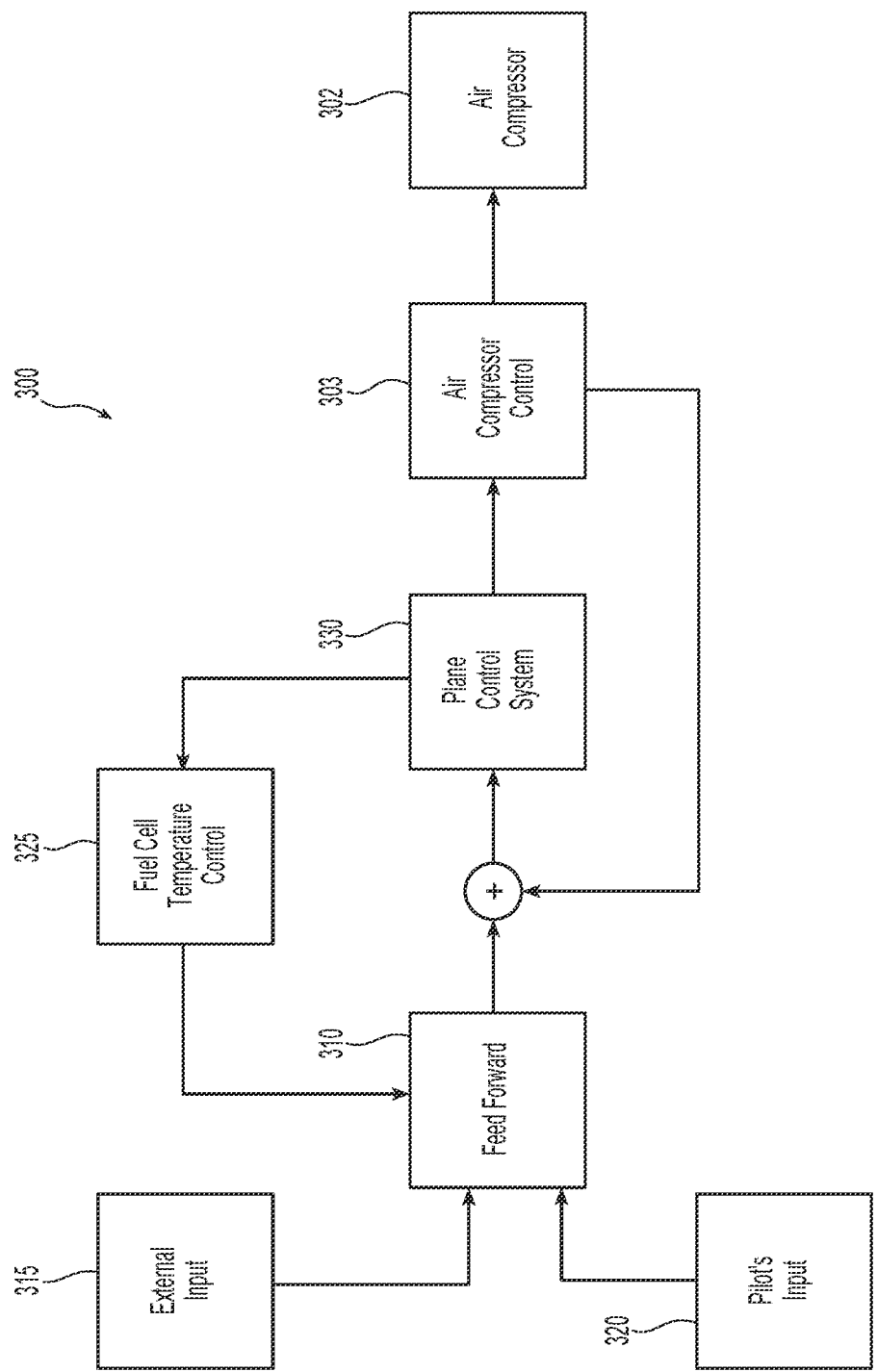
FIG. 3 illustrates feed forward load prediction algorithm control loop.

4. Feed Forward Load Prediction Algorithm (FIG. 3)

During normal operation of the fuel cell, e.g., fuel cell 201 (FIG. 2), the response time of the fuel cell, e.g., fuel cell 201, power output compared to the application requirements is almost exclusively due to the physical ramp up of the air compressor, e.g., compressor 302. At or close to maximum power levels, the fuel cell 201 also begins to encounter a thermal limit to its power output. It is envisioned to use multiple inputs from the pilot 320 and control system 315 to generate a future load feed forward calculating algorithm 310 in preparation of future conditions and power requirements and to adjust the air supply 303, 302 and active cooling mechanisms built into the fuel cell temperature control system 325.

Using a series of pilot-operated inputs 320 along with calculations from the plane's avionics and control system 315, the compressor 302 speed can be anticipated for future power requirements, rather than rely on instantaneous power requirements (surges).

This ensures that the fuel cell 201 has the correct amount of airflow at all times, regardless of external factors and instantaneous power surges.

This will decrease power delivery response time from the fuel cell 201, contributing to an overall safer operation of the fuel cell system 300.

It is also envisioned that if the cooling circuits are also ramped up in preparation for high power output, then safer and more reliable operation of the fuel cell 201 will occur.

This anticipatory calculation is the feed forward portion of the algorithm 310 shown in FIG. 3.

Figure 4A:
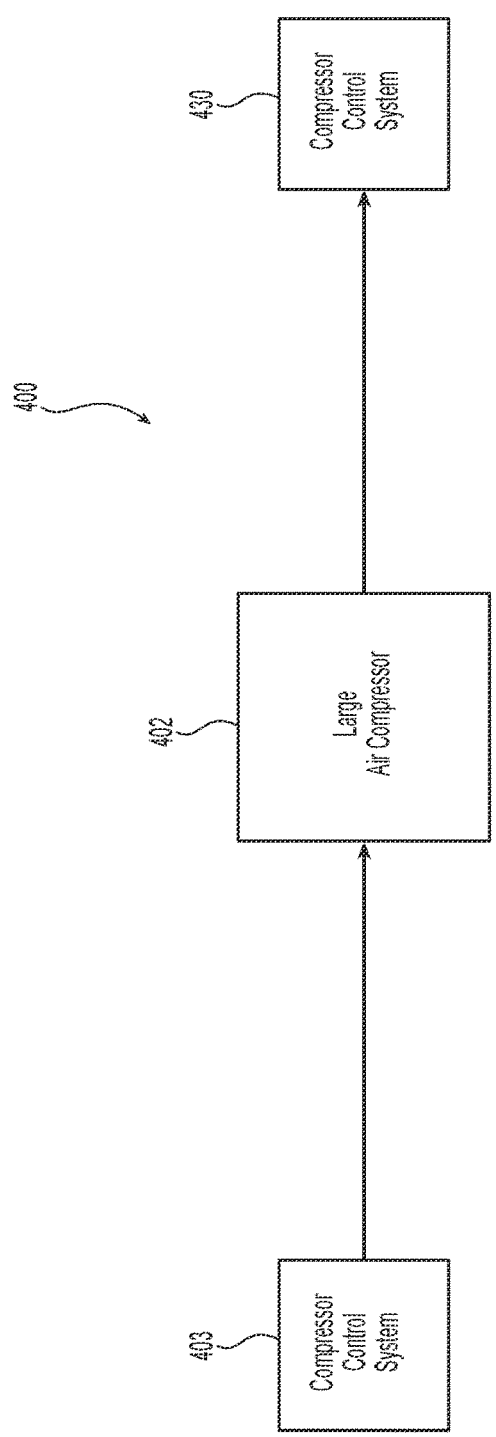
FIG. 4A illustrates an electronically controlled air compressor for quick response utilizing one large compressor for high load demand.
Figure 4B:
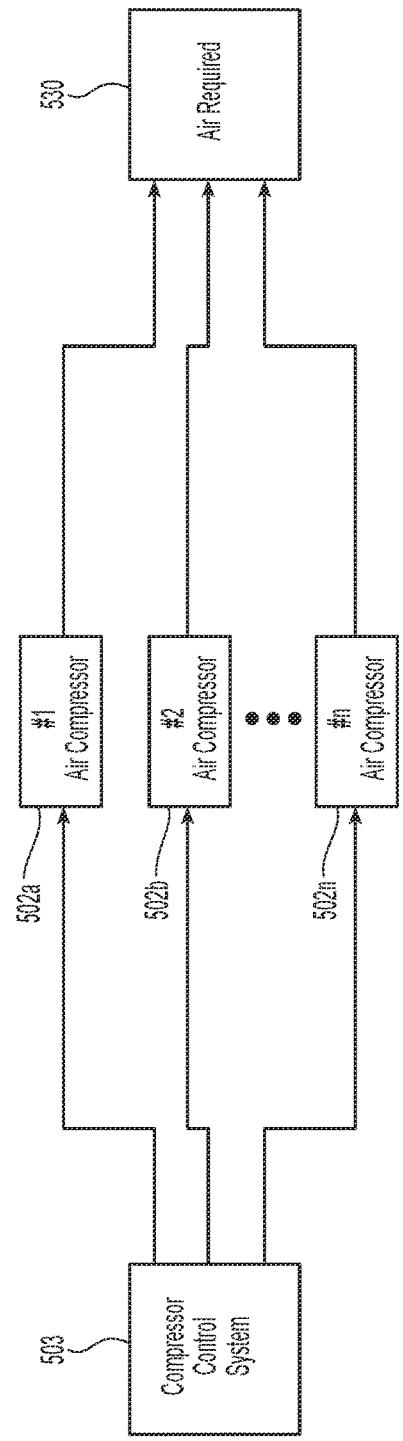
FIG. 4B illustrates a series of electronically controlled air compressors for quick response during high load demand.

5. Electronically Controlled Air Compressor for Quick Response (FIGS. 4A and 4B)

In order for the fuel cell system 400, 500 to operate without a buffer battery, the power delivery must be smooth, controllable, and predictable as the load requirements change. Since the fuel cell system 400, 500 is almost exclusively throttled through the flow of oxygen into the fuel cell stack, the supply of oxygen must also be equally controllable. In order to accomplish this, the air compressor 402, 502a-502c supplying the oxygen must be controllable independent of the load. There are two methods to achieve this:

1) using an electronically controllable air compressor, which is fed input signals from an external device, e.g., compressor control system 403, 503. This external device 403, 503 will be in the flight computer onboard the aircraft; and/or 2) using a shaft-driven mechanical air compressor, using the drivetrain for its input power (not shown). In order to control the flow and pressure of air into the fuel cell system 400, 500 at various engine speeds, the compressor 402, 502a-502c will have either an electronically-controlled valve or spring-actuated wastegate (not shown) that bleeds unnecessary air away.

6. Oversized Air Compressor for Quick Response (FIG. 4A)

Generally, the air compressors 402 are sized to provide the fuel cell's peak output power at their fastest speeds/highest flow rates. Since there is a certain time lag for the air compressor 402 to speed up and slow down as power demands vary, the air compressor 402 can be oversized to compensate for this lag. With a larger air compressor 402 n the system, the fuel cell will be able to meet its air requirements sooner, as it does not need it to come to full speed. If the air requirements are met sooner, then the use case for a buffer battery is eliminated.

7. Paralleled Air Compressors for Quick Response (FIG. 4B)

Conversely to the previous inventive idea, if a larger air compressor, e.g., compressor 402, is not feasible due to packaging constraints or weight, several air compressors 502a-502c plumbed in parallel may be used to meet the fuel cell's air requirements. These air compressors 502a-502c may vary in size, or be staged in a compounding setup to better fit the packaging and air requirements of the application. Smaller air compressors 502a-502c will have less inertia to overcome and therefore are able to change their flow rates quicker. If the air requirements are met sooner, a buffer battery may be eliminated.

8. Starting the Fuel Cell System without an Onboard High Voltage Source

In order for fuel cell systems to start creating power, air flow must first be introduced. As discussed previously, the air flow traditionally comes from an onboard electric air compressor. These air compressors are generally high voltage items, and thus require a high voltage source to begin operating. This high voltage source is usually the buffer battery. Without a buffer battery, it is envisioned that the following methods may be utilized to start the fuel cell system:

Because only a small amount of air flow is required to begin the fuel cell system, a small, low-voltage air compressor can be designed into the system that operates at the traditional 24V aviation voltage level. This compressor would be sized so that it could provide enough air flow to start the main compressor(s) in the fuel cell system from the fuel cell output power at any point in the plane's flight plan, primarily used for ground start operation, and emergency in-flight restart operation.

A ground start procedure using a high voltage battery can be implemented to start the fuel cell process. From that point on, the fuel cell and air compressors would be self-sufficient. If a failure occurred during flight, and the system needed to be restarted, a valve can be built into the plane and fuel cell system to utilize a "Ram-Air" effect using the plane's forward motion to provide the necessary airflow to restart the fuel cell system.

The fuel cell system can also carry an emergency supply of compressed air that can be used to start the fuel cell system in the event of an emergency. The compressed air can be sized to allow for several restart attempts, and will provide ample air to start the fuel cell system so it can then start the onboard high voltage air compressor.

The motor(s) in an electric drivetrain free-wheel when power is not applied. If an in-air restart needs to occur, and a mechanical air compressor is being utilized, rather than an electric air compressor, then the spinning of the propeller attached to the free-wheeling motors should be enough energy to spin the air compressor and generate the necessary air flow through the fuel cell system to power up the motor(s) and begin normal operation again.

FIG. 1 illustrates overall architectures—traditional and proposed Systems:

101—Fuel Cell: Provides electric power to inverter.

102—Air Compressor: Provides the necessary Air Flow to the Fuel Cell.

103—DC/DC Converter: Conditions the Fuel Cell Voltage Output to Charge the Battery.

104—Battery: In conventional systems, this is used to fill gaps where the Fuel Cell(s) lack power.

105—Inverter: Converts DC electricity from the fuel cell into AC electricity for the motor.

106—Motor: Generates torque to spin the propulsor's shaft.

FIG. 3 illustrates Feed Forward Load Prediction Algorithm Control Loop.

FIGS. 4A, 4B illustrate Electronically Controlled Air Compressor(s) For Quick Response.

FIG. 4A shows a typical system configuration with a single oversized air compressor.

FIG. 4B shows a system configuration utilizing 'n' number of air compressors.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive.

Moreover, other implementations of the invention will be apparent to those skilled in the art from consideration of the specification and practice of the invention disclosed herein. Various aspects and/or components of the described embodiments may be used singly or in any combination in aircraft power plants. It is intended that the specification and examples be considered as exemplary only, with a true scope and spirit of the invention being indicated by the following claims.

What is claimed is:

1. A fuel cell system for an aircraft, comprising:
   a plurality of electronically controlled air compressors operably coupled to a fuel cell and configured to provide compressed air to the fuel cell for operation thereof, said fuel cell configured to be coupled to an aircraft; and
   an air compressor control system configured to control the flow of compressed air from the plurality of electronically controlled air compressors to the fuel cell independent of power load requirements of the aircraft, wherein the plurality of electronically controlled air compressors are arranged in parallel to meet a compressed air flow rate demand of the fuel cell at the request of the air compressor control system to enable the fuel cell to deliver on demand consistent power to the aircraft without requiring a buffer battery.

2. The fuel cell system according to claim 1, wherein the plurality of electronically controlled air compressors are staged based on packaging or weight requirements of the aircraft.

3. The fuel cell system according to claim 1, wherein the plurality of electronically controlled air compressors are staged based on air flow requirements of the fuel cell.

4. A method for powering an aircraft utilizing a fuel cell system and without using a buffer battery, comprising:

operably coupling a plurality of electronically controlled air compressors to a fuel cell, the plurality of electronically controlled air compressors configured to provide compressed air to the fuel cell for operation thereof; and controlling the flow of compressed air from the plurality of electronically controlled air compressors to the fuel cell independently of power load requirements of the aircraft using an air compressor control system, the plurality of electronically controlled air compressors being arranged in parallel to meet a compressed air flow rate demand of the fuel cell at the request of the air compressor control system to enable the fuel cell to deliver on demand power to the aircraft without requiring a buffer battery.

5. The fuel cell system for an aircraft according to claim 4, further comprising staging the plurality of electronically controlled air compressors based on packaging or weight requirements of the aircraft.

6. The fuel cell system for an aircraft according to claim 4, further comprising staging the electronically controlled air compressors based on air flow requirements of the fuel cell.

\* \* \* \* \*